United States Patent [19]
Masuda

[11] Patent Number: 5,264,068
[45] Date of Patent: Nov. 23, 1993

[54] EXPANDABLE DRUM INCLUDING ADJUSTABLE STOPS FOR SETTING DRUM CIRCUMFERENCE

[75] Inventor: Kenichi Masuda, Shirakawa, Japan

[73] Assignee: Sumitomo Rubber Industries Limited, Kobe, Japan

[21] Appl. No.: 871,474

[22] Filed: Apr. 21, 1992

[30] Foreign Application Priority Data

Apr. 30, 1991 [JP] Japan .................................. 3-99051

[51] Int. Cl.⁵ .............................................. B29D 30/24
[52] U.S. Cl. ................................... 156/417; 156/414; 279/2.13
[58] Field of Search ............... 156/417, 414, 418, 420, 156/415; 279/2.11, 2.12, 2.13, 2.14, 2.15

[56] References Cited

U.S. PATENT DOCUMENTS

| | | |
|---|---|---|
| 3,178,331 | 4/1965 | Bishop et al. . |
| 3,207,648 | 9/1965 | Shilts . |
| 3,873,398 | 3/1975 | Yokoo et al. . |
| 3,929,546 | 12/1975 | Katagiri et al. . |
| 5,066,354 | 11/1991 | Benjamin .......................... 156/414 |

FOREIGN PATENT DOCUMENTS

| | | |
|---|---|---|
| 431854 | 6/1991 | European Pat. Off. . |
| 468718 | 1/1992 | European Pat. Off. . |
| 1240267 | 5/1967 | Fed. Rep. of Germany ...... 156/417 |

*Primary Examiner*—Geoffrey L. Knable

[57] ABSTRACT

Apparatus for forming an annular product features in such arrangement that, around a drum shaft sheathing over a main shaft, tapering structures each having axial slidability are provided, and in response to a slide move of the tapering structure, drum segments are each radially expanded or retracted. A stopper for controlling a slide move of the tapering structure is provided and an axial position of the stopper is regulated by a motor through a ball screw mechanism disposed in the main shaft. Thereby, settings and changes of a circumferential length of the drum which determines the length of the annular product are easily made and can be made with great certainty.

10 Claims, 4 Drawing Sheets

EXPANDABLE DRUM INCLUDING ADJUSTABLE STOPS FOR SETTING DRUM CIRCUMFERENCE

FIELD OF THE INVENTION AND RELATED ART STATEMENT

The present invention relates to an apparatus for forming an annular product, in a particular, the annular product for use in tire building process.

Generally, in the process of building a pneumatic radial tire, an annular product is formed around a drum by fitting such materials as breakers, reinforcing belts, and treads, and the annular product (generally, "product" herein may be more correctly referred to as "in-process or intermediate product") will be attached or integrated with a carcass part which is pre-fabricated on another drum, to produce a green tire. The invention relates to the process of manufacturing the annular products mentioned above.

The conventional art employed heretofore is explained with reference to FIG. 4. Therein, 1 is a drum shaft, 2 is a rotary drum which is divided, as viewed sectionally of the drum, into a plurality of drum segments 3 having each a sector shape, wherein every segment 3 is supported around the shaft 1 by a supporter 4 and is made retractile radially by an air bag 5. And each drum circumferential face 3 is provided with an engaging device at each longitudinal end of the drum to engage with an angled edge of the control ring 7, when the bag 5 is inflated as shown in the lower half of FIG. 4. Thus, the amount of inflation or radial expansion X is regulated.

Then, the conventional apparatus should have the control rings 7 in order to realize the aimed circumferential length at the expanded state (or the radial expansion X), but this length is much affected by the accuracy resulted from the machinery work on the control rings 7 during manufacture. Actually large deviations or errors were found. Further, when a change in the circumferential length is required, demounting of the rings 7 is necessary and in turn, the preparation of a number of such rings is needed to comply with changes of such length. Disadvantages are found in uneconomical stock of the rings 7 having different lengths and in a lengthy suspension time due to the exchange work.

OBJECT AND SUMMARY OF THE INVENTION

This invention has been achieved in view of conventional disadvantages and with the idea of dispensing with the control rings. The object of the present invention is to offer an apparatus for forming an annular product which enables the settings of different circumferential lengths or desired radial lengths with ease and certainty. Other objects and merits derived herefrom will be apparent hereinafter.

The present invention is summarized as follows:

An apparatus of this invention for forming an annular product features in the mechanism comprising a drum shaft, a tapering structure disposed axially slidable on the drum shaft, a slide drive means for sliding axially the tapering structure, a drum disposed around an outer face of the tapering structure and being displaceable or retractile radially in response to a slide move of the tapering structure, and a position setting means for setting an axial position of the tapering structure so as to determine an amount of radial expansion in response to a given requirement on the diametric length of the drum. According to the mechanism included in the apparatus of the present invention, the tapering structure is moved axially, that is, longitudinally by the slide drive means, wherein one directional move of the tapering structure increases or expands the drum diameter and in opposite, the other directional move of the same decreases or retracts the drum diameter. During this move, the position setting means determines or sets a position for stopping the tapering structure so that, at the stopped position, an aimed or required diametric length of the drum is realized. According to the inventive apparatus, first setting of a circumferential length of the drum, that is, setting of a drum diameter and a change thereof are feasible with ease and certainty, which brings about large improvement in the working efficiency as compared with that heretofore. Stated in more detail, the drum shaft of the inventive mechanism is mounted sheathing an fixed inner shaft concentric with the ability of relative rotation about the fixed shaft. The slide drive means is comprised of a hydraulic cylinder device.

The position setting means is comprised of a stopper for determining axial positions of the tapering structure, a screw mechanism, mounted within the drum shaft, for regulating the stopper axially, and a screw drive mechanism for rotating the screw mechanism.

The drum is comprised of a plurality of drum segments divided and arranged circumferentially, a pair of support flanges secured to the drum shaft at two axial or longitudinal positions with a predetermined distance inbetween and provided with guide means which run radially on the inner opposite faces, and drum segment supporters, circumferentially divided in correspondence to the drum segments, each segment supporter having an inner recessed face formed to be generally complementary to the outer taper face of the tapering structure and being retractile radially with the aid of the guide means and being contactable with the outer face of the tapering structure with the aid of a device which will be mentioned later.

A guide rail is provided on the outer face of the tapering structure and a slider is provided on the inner face of the segment supporter, wherein the slider and the guide rail are slidably engaged.

The slide drive means is comprised of a piston secured to the outer face of the drum shaft, a power cylinder body mounted slidable on the drum shaft and housing the piston inside, and a rod which is fixed to the cylinder body and connects the cylinder body to the tapering structure. The stopper is mounted inside the drum and slidable along the drum shaft so that the stopper will contact or be away from the front end of the tapering structure. Further, the stopper is connected to a rod which extends through the flange wall outside, and the extension end is connected to another flange located outside and this outside flange or adjusting flange is associated with the screw mechanism as will be apparent later.

The screw mechanism comprises adjusting rod, nut, and screw shaft. The adjusting rod has one end connected to a center of the adjusting flange with axial movability and with relative rotatability. Thereby the adjusting rod is permitted to rotate, and this rod and the adjusting flange are permitted to move in unison axially, and the adjusting rod has the other end connected, by insertion, into a center bored space of the main shaft with axial movability and with no relative rotatability. The nut is secured at a center bore formed in the other end of the adjusting rod, and the screw shaft is engaged with the nut and is connected, by insertion, into a center of the main shaft with rotatability, and the other end of the screw shaft is connected to the drive means which is formed of a motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a view similar to FIG. 1, wherein FIG. 3 shows an expanded state of the drum, and FIG. 1 shows a retracted state of the drum.

These drawings are presented by way of illustrating the invention and these should not be construed as limiting the invention.

DESCRIPTION OF THE PREFERRED EMBODIMENT(S)

Below, the invention will be described with reference to the drawings.

Figure 1:
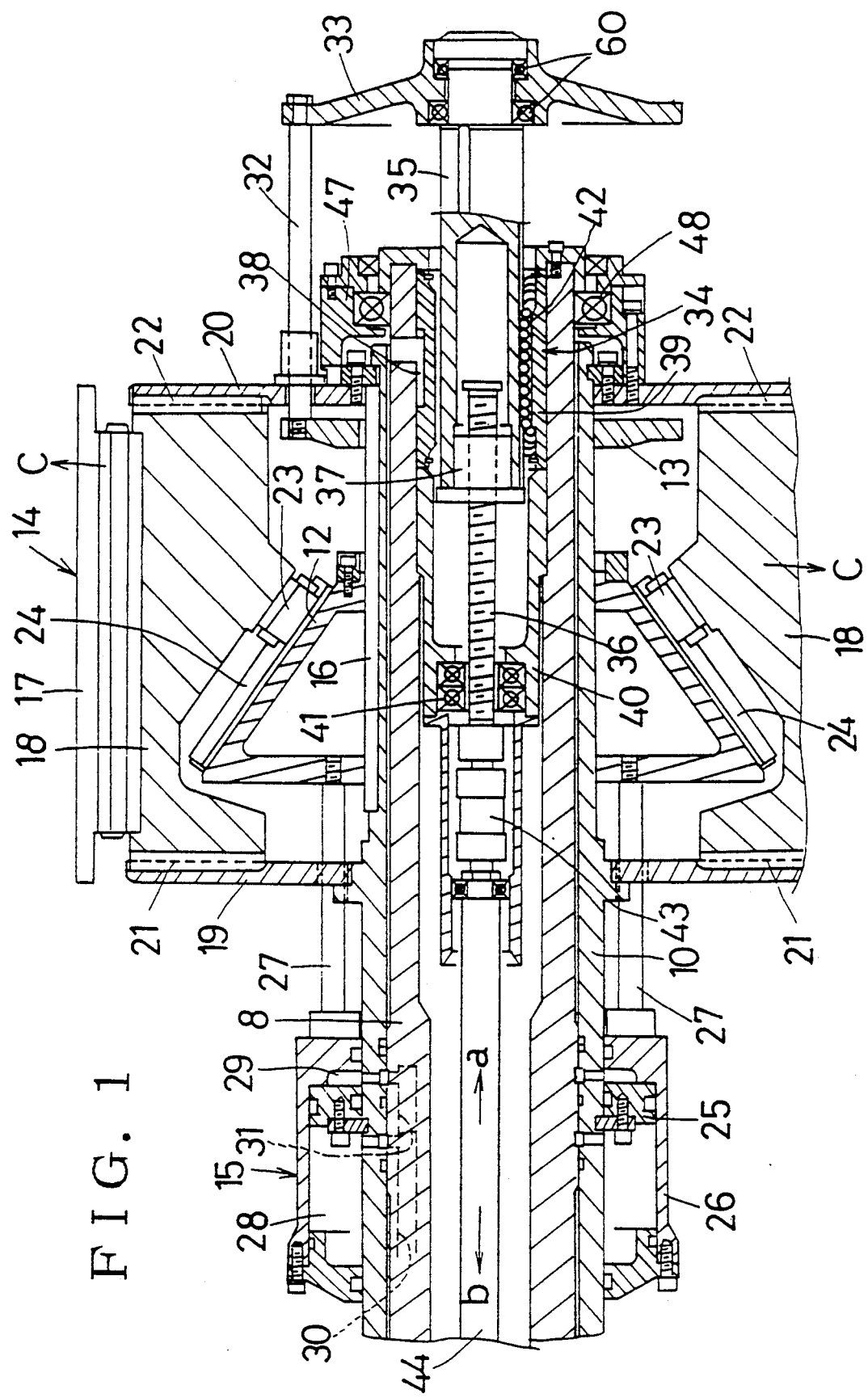
FIG. 1 is a longitudinal sectional view including mainly the drum and its vicinity of an embodiment of the present invention.
Figure 2:
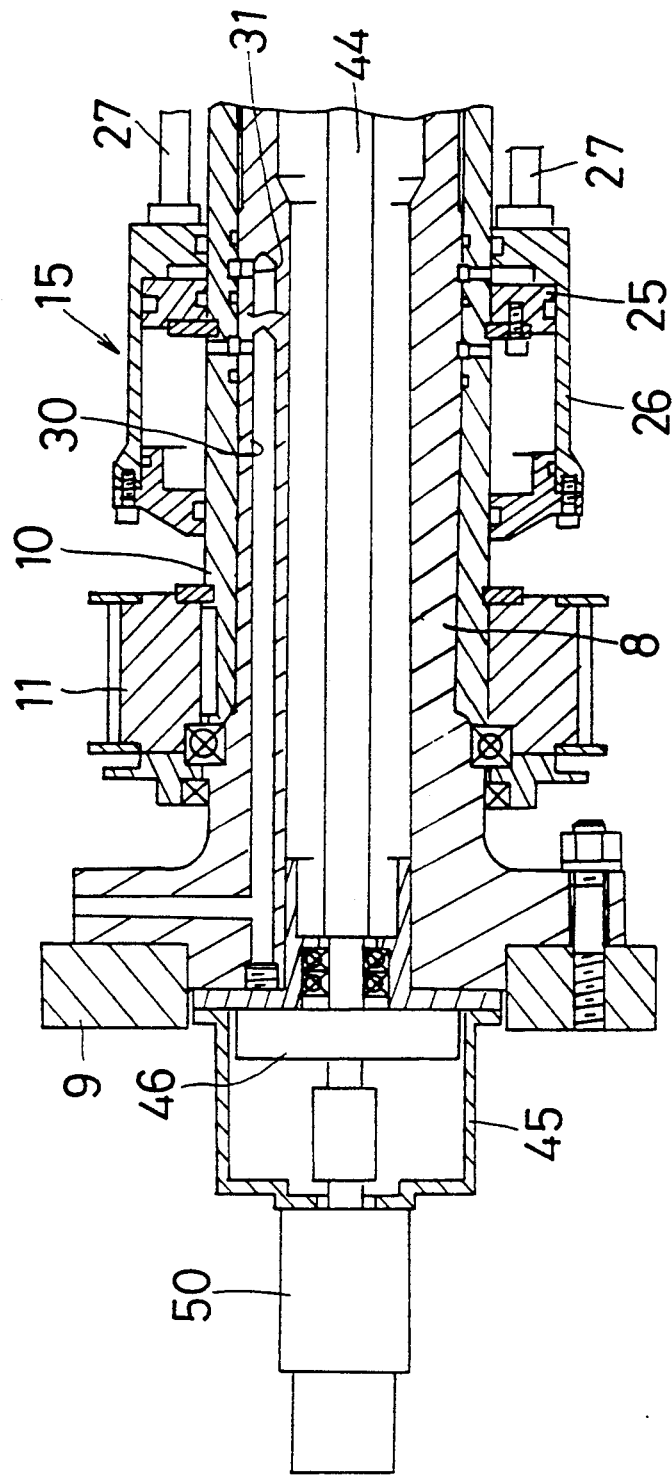
FIG. 2 is a longitudinal sectional view including mainly the base portion, wherein a part viewed in the left side in FIG. 1 is again shown in the right side in FIG. 2.

In FIGS. 1 and 2, a sleeve main shaft 8 has one end unrotatably mounted to the fixed main frame 9, and a drum shaft 10 is rotatably formed sheathing over the main shaft 8, and mounted along the drum shaft 10 are: a pulley 11 in the vicinity of the above end; a tapering structure 12, a stopper 13, a drum 14 at the other end portion; a power cylinder 15 forming a slide drive means at intermediate places.

The tapering structure 12 is of an inner recessed frustum and is mounted over the drum shaft 10 longitudinally or axially slidable with the aid of a key 16, and housed in the drum 14. The drum 14 is circumferentially divided into a plurality of drum segments 17, each being like a sector, and each segment 17 is interiorly supported by a drum segment supporter 18.

It is to be noted here that the drum and the drum supporter are, although not shown in the drawings attached herewith, each circumferentially divided into a plurality of segments, and the manner of these arrangements is similar to FIG. 2 which is attached with the publication of European Patent Application No. 0468718A2 (Publication date: 29.01.92). Then, on the drum shaft 10, a pair of supporting flanges 19, 20 are erected fixedly at two places spaced along the axial length of the segment supporter 18, and guide means 21, 22 which run radially on each inner face of the flanges 19, 20 are provided, and with the aid of the guide means 21, 22, each segment supporter 18 is carried to be radially retractile by the flanges 19, 20 therebetween.

On the inner face of each segment supporter 18, a slider 23 is mounted, and each slider 23 is carried to engage slidably with a guide rail 24 formed on the outer face of the tapering structure 12, which arrangement enables a radial retractile act of the segment supporters 18 and thus, of the drum segments 17, in response to an axial slide move of the tapering structure 12.

The power cylinder 15 or slide drive means is for driving the tapering structure 12 to slide axially or longitudinally of the drum shaft 10. A piston 25 is provided which is fixed to the drum shaft 10, and a cylinder body 26 is mounted slidably on the drum shaft 10 and houses a piston 25 inside. A rod 27 is fixed to the cylinder body 26. On the circumference, a plurality of the power cylinders 15 are mounted. Therein, a hydraulic fluid is designed to be supplied to each chamber 28, 29 of the cylinder 15 via oil passages 30, 31 formed in the main shaft 8 and drum shaft 10, and therein the rod 28 extends through a hole which is provided through the flange wall 19.

A stopper 13 is comprised of a position setting means for controlling where the tapering structure 12 should stop on the axial route, and the stopper 13, housed in the drum 14 and made with a ring shape, is mounted around and erected on the drum shaft 10, and is placed between the front end of the tapering structure 12 and the supporting flange 20, and is connected to the flange 33, located outside, with a plurality of rods 32 arranged circumferentially. The flange 33 is carried at its center rotatably by a bearing 60 mounted at the front end of an adjusting rod 35 included in a ball screw mechanism 34.

The ball screw mechanism 34 is designed to regulate an axial position of the stopper 13 by drive of a drive means 50 (see FIG. 2), arranged inside the main shaft 8. This mechanism 34 comprises a screw rod 36 and a ball nut 37 which engages with the screw rod 36, wherein the screw rod 36 is borne by a first and a second retainer cylinders 39, 40 secured inside the main shaft 8 together with the aid of the bearing 41 so as to only rotate. The nut 37 is secured to the adjusting rod 35. The adjusting rod 35 is inserted into the first retainer cylinder 39 and carried by balls 42 to be movable axially. The screw shaft 36 is connected to the motor 50, that is, rotary drive means through a coupling 43 and a drive shaft 44. The motor 50 is mounted on the base 45 and connected to an end of the main shaft 8, wherein at the same end of the shaft 8, an electromagnetic brake 46 is mounted for controlling the shaft 44 while not magnetically excited.

Therein, the bearing case 47 is secured to the supporting flange 20, and in the bearing case 47, the bearing device 48 for the shaft 8 is rested.

Turning the description to operational aspect, in the operation of determining a necessary circumferential length around the drum 14, it is recommended to pre-store calculation formulas or information into a desk-top computer and to prepare, in response to inputs of data which stand for the circumferential lengths, control data for the motor 50 will be output so that the motor 50 operates as desired to slide the tapering structure 12 and the stopper 13 operates automatically.

That is, when the electromagnetic brake 46 disengages and the motor 50 starts working, the screw shaft 36 rotates normally or counter-clockwise to reach the calculated requirement so that the adjusting rod 35 moves in the direction indicated by arrows a or b in FIG. 1 with the aid of the ball nut 37. Thereby the flange 33 moves in unison with the adjusting rod 35 in a or b arrow direction and thus the stopper 13 moves in a or b arrow direction. Then, when the motor 50 stops, the electromagnetic brake 46 controls the drive shaft 44 and the stopper 13 determines the place wherein the stopper position is retained with certainty for the merit of the ball screw mechanism 34.

Figure 3:
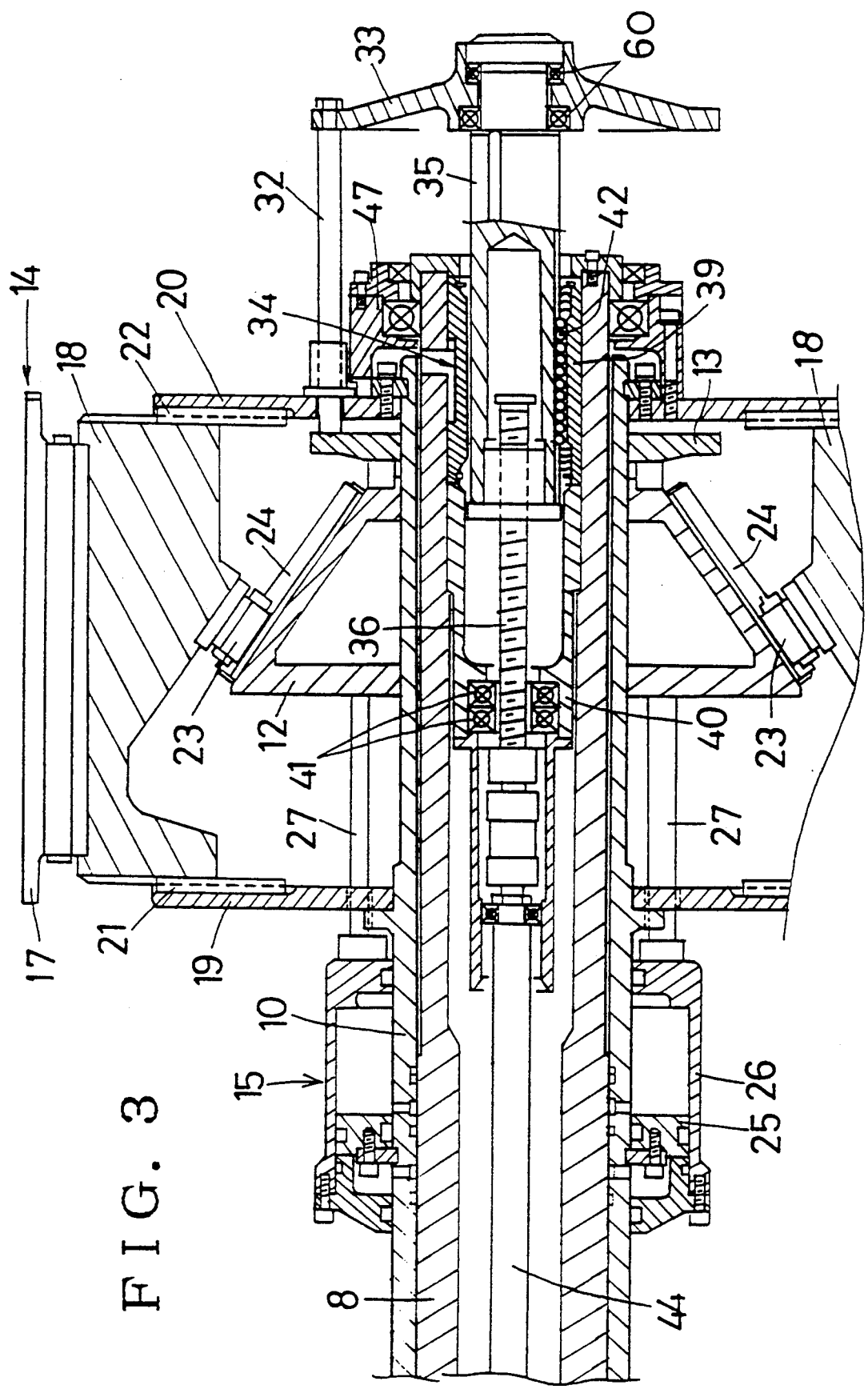
Figure 4:
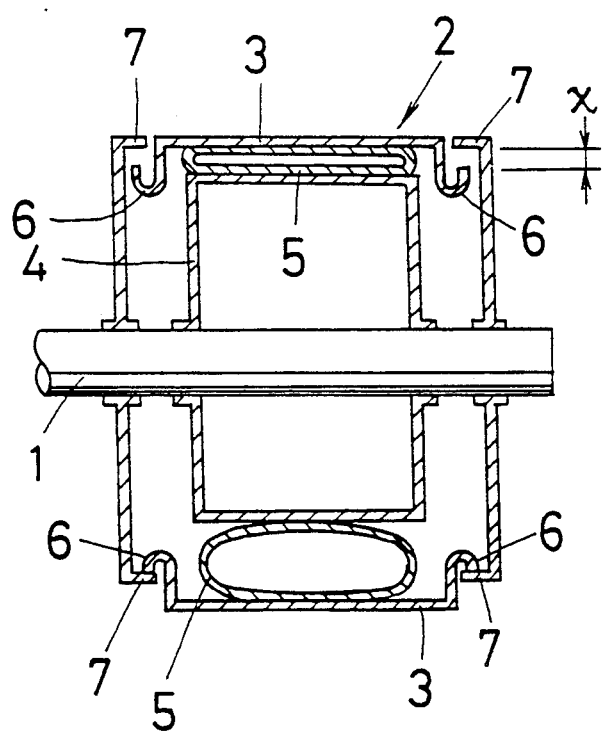
FIG. 4 is a sectional view to explain prior art.

Then, when the hydraulic fluid is supplied to the chamber 29, the cylinder body starts moving in a arrow direction, and in turn, pushes the tapering structure 12 to slide in a arrow direction, by action of the guide rail 24 and the slider 23, each segment supporter 18 and thus each drum segment 17 starts radially outwardly, that is, the expansion starts in c arrow direction and in turn, an enlarged drum 14 is formed. Then, as shown in FIG. 3, when the tapering structure 12 abuts the stopper 13 and stops, the drum 14 is provided with an aimed circumferential length. Thereby the operation is finished for actualization of the intended length.

As is seen, conventional rings for limiting the drum diameters are dispensed with and therefore uneconomical stock to prepare for different cicumferential lengths is saved. As compared with exchanges of the rings, settings of different circumferential lengths and changes thereof are facilitated greatly and higher working efficiency is attained. Further, the motor 50 and the ball screw mechanism 34 are employed, by which art settings of circumferential lengths of annular products are permitted without stepwise limitation. When a computer is included to set the lengths, lengths which were once set in the past can be called out by only indicating the product codes. Therein, the use of the ball screw mechanism 34 enables durable retention of high accuracy after the setting so that a difference or error between the set length and the product real length is reduced as small as within 1 mm. High reliability is attained.

Turning back to the operation, when the cylinder body 26 of the cylinder device 15 is slid in the b arrow direction, the tapering structure 12 is in unison therewith so that the slider 23 slides on the guide rail 24 and thus, the segments 17 and in turn, the drum 14 tend to retraction.

In the case of the green tire building work, the drum 14 is rotated to attach the breakers, reinforcing belts, and treads over the drum cicumferential face. The rotation of the drum causes the concurrent rotation of stopper 13 and the flange 33 about the adjusting rod 35, but the ball screw mechanism 34 housed in the main shaft 8 is not affected.

The present invention should not be interpreted as being limited by the embodied descriptions. Further various modifications and changes on the disclosures herein are obvious, but such art should be included into the technical scope of the present invention.

What is claimed is:

1. An apparatus for forming an annular product comprising:
   a sleeve main shaft which is fixed and nonrotatable;
   a drum shaft on the main shaft, the drum shaft being sheathed over the main shaft and being rotatable relative to the main shaft, the drum shaft having one shaft end adjacent to one end of the main shaft;
   a pair of supporting flanges fixed on an outer face of the one end of the drum shaft, a predetermined axial space being provided between the flanges;
   a tapering structure mounted in the predetermined space between the pair of supporting flanges, the tapering structure being mounted on the drum shaft and being axially slidable thereon;
   a plurality of segment supporters, each interiorly supporting a drum segment and being engaged with an outer face of the tapering structure and with inner faces of both of the flanges of the pair of supporting flanges, the segment supporters being radially movable for expanding and retracting;
   first drive means mounted on the drum shaft for moving the tapering structure axially to cause radial movement of the segment supporters and drum segments;
   a stopper mounted on the one end of the drum shaft, the stopper being axially movable, the tapering structure abutting the stopper to stop axial movement of the tapering structure in a first direction;
   a plurality of rods extending from the stopper and terminating beyond the one end of the main shaft;
   a stopper flange fixed to the ends of the plurality of rods extending beyond the one end of the main shaft;
   an adjusting rod fitted on a generally central portion of the stopper flange, the stopper flange being rotatable about the adjusting rod, the adjusting rod extending from the sleeve main shaft and being movable axially relative thereto; and
   second drive means mounted on an end of the sleeve main shaft opposite to said one end for moving the adjusting rod axially relative to the sleeve main shaft.

2. The apparatus as defined in claim 1, wherein the first drive means comprises a power cylinder unit.

3. The apparatus as defined in claim 2, wherein the second drive means is a motor and wherein the motor is operatively connected to the adjusting rod to axially reciprocate the adjusting rod relative to the sleeve main shaft, the apparatus further comprises a brake for stopping movement of the adjusting rod in order to hold the stopper flange in a selected position, movement of the stopper flange thereby moving the plurality of rods and the stopper connected thereto.

4. The apparatus as defined in claim 3, further comprising a screw rod, a ball nut, a first retainer cylinder and a second retainer cylinder, the ball nut being in engagement with the screw rod and the first and second retainer cylinders are positioned inside the sleeve main shaft and the screw rod is supported by the first and second retainer cylinders, the nut further being engaged with the adjusting rod and the adjusting rod being inserted into the first retainer cylinder and being axially movable relative thereto, the screw shaft being operatively connected to the motor and being rotatably driven thereby, rotation of the screw shaft moving the adjusting rod axially along the sleeve main shaft.

5. The apparatus as defined in claim 1, wherein the second drive means is a motor and wherein the motor is operatively connected to the adjusting rod to axially reciprocate the adjusting rod relative to the sleeve main shaft, the apparatus further comprises a brake for stopping movement of the adjusting rod in order to hold the stopper flange in a selected position, movement of the stopper flange thereby moving the plurality of rods and the stopper connected thereto.

6. The apparatus as defined in claim 5, further comprising a screw rod, a ball nut, a first retainer cylinder and a second retainer cylinder, the ball nut being in engagement with the screw rod and the first and second retainer cylinders are positioned inside the sleeve main shaft and the screw rod is supported by the first and second retainer cylinders, the nut further being engaged with the adjusting rod and the adjusting rod being inserted into the first retainer cylinder and being axially movable relative thereto, the screw shaft being operatively connected to the motor and being rotatably driven thereby, rotation of the screw shaft moving the adjusting rod axially along the sleeve main shaft.

7. The apparatus as defined in claim 1, wherein the pair of supporting flanges are between the drum segments and the drum shaft and the drum formed by the drum segments is generally located adjacent the predetermined axial space provided between the pair of flanges.

8. The apparatus as defined in claim 1, further comprising at least one guide rail and at least one slider, the at least one guide rail being mounted on an outer face of the tapering structure and the at least one slider being connected to the segment supporter and to the at least one guide rail, the at least one slider being movable along the at least one guide rail as the tapering structure moves relative to the segment supporter.

9. The apparatus as defined in claim 1, wherein the tapering structure reciprocates along the drum shaft in one of a first and second direction, the tapering structure moving away from the first drive means when moving in the first direction and the tapering structure moving toward the first drive means when moving in the second direction, movement of the tapering structure in the first direction causing the segment supporters to expand and movement of the tapering structure in the second direction causing the segment supporters to retract.

10. The apparatus as defined in claim 1, wherein the first drive means comprises a power cylinder unit and wherein the power cylinder unit further comprises a piston, a cylinder body and a rod, the cylinder body being mounted slidably on the drum shaft, the piston being fixed to the drum shaft and being housed within the cylinder body, the rod being fixed to the cylinder body and being connected to the tapering structure, movement of the cylinder body axially along the drum shaft thereby moving the tapering structure axially along the drum shaft.

* * * * *